(12) United States Patent
Borer

(10) Patent No.: US 6,345,106 B1
(45) Date of Patent: Feb. 5, 2002

(54) GRADIENT BASED MOTION ESTIMATION

(75) Inventor: Timothy John Borer, Surrey (GB)

(73) Assignee: Innovision Limited, Surrey (GB)

( * ) Notice: Subject to any disclaimer, the term of this patent is extended or adjusted under 35 U.S.C. 154(b) by 0 days.

(21) Appl. No.: 09/142,763

(22) PCT Filed: Mar. 3, 1997

(86) PCT No.: PCT/EP97/01068

§ 371 Date: Sep. 14, 1998

§ 102(e) Date: Sep. 14, 1998

(87) PCT Pub. No.: WO97/34259

PCT Pub. Date: Sep. 18, 1997

(30) Foreign Application Priority Data

Mar. 13, 1996 (GB) .............................................. 9605264

(51) Int. Cl.[7] .................................................. G06K 9/00

(52) U.S. Cl. ........................ 382/107; 382/100; 73/488; 356/27

(58) Field of Search .......................... 348/140, 97, 154, 348/155; 382/107, 100; 356/2 F; 73/488; 375/240.17

(56) References Cited

U.S. PATENT DOCUMENTS

| 5,430,809 A | * | 5/1997 | Tomitaka ..................... 382/173 |
| 5,627,905 A | * | 5/1997 | Sebok et al. ................ 382/107 |
| 6,148,033 A | * | 11/2000 | Pearlstein ............... 375/240.17 |
| 6,198,772 B1 | * | 3/2001 | Bolce et al. ........... 375/240.17 |

FOREIGN PATENT DOCUMENTS

| EP | 0 596 409 | 5/1994 | ........... G06F/15/70 |
| EP | 2 305 569 | 4/1997 | ............ G06K/9/00 |

OTHER PUBLICATIONS

J.K. Aggarwal et al., "On the Computation of Motion from Sequences of Images—A Review", pp. 917–935, Proceedings of the IEEE, vol. 76, No. 8, Aug. 1988.

M. Bierling et al., "Motion Compensating Field Interpolation Using A Hierarchically Structured Displacement Estimator", pp. 387–404, Signal Processing, vol. 11, No. 4, Dec. 1986.

C. Cafforio et al., "Motion Compensated Image Interpolation", pp. 215–222, IEEE Transactions on Communications, vol. 38, No. 2, Feb. 1990.

E. Dubois et al., "Review of Techniques for Motion Estimation and Motion Compensation", pp. 3B.3.1.–3B.3.19, INRS–Telelcommunications, Canada.

C.L. Fennema et al., "Velocity Determination in Scenes Containing Several Moving Objects", pp. 301–315, Computer Graphics and Image Processing vol. 9, 1979.

J. Konrad, "Issues of Accuracy and Complexity in Motion Compensation for ATV Systems", pp. 1–25, INRS–Telecommunications, Canada, Contribution to "Les Assises Des Jeunes Chercheurs", CBC, Montreal, Jun. 21, 1990.

(List continued on next page.)

Primary Examiner—Leo Boudreau
Assistant Examiner—Mahmood Choobin
(74) Attorney, Agent, or Firm—Young & Thompson

(57) ABSTRACT

A technique for generating motion vectors in video and film signal processing uses constraint equation based motion estimation. Simplifications of the processing and hardware are made possible by generating motion vectors based on the normalized constraint equation. The temporal and spatial image gradients are calculated using temporal and spatial differentiators (16, 17, 18). An angle (θ) corresponding to the orientation of the spatial image gradient vector and the motion speed (vn) in the direction of the vector are calculated using apparatus including a rectangular to polar coordinate converter (32). θ and vn are the parameters of the normalized constraint equation.

8 Claims, 10 Drawing Sheets

OTHER PUBLICATIONS

D.M. Martinez, "Model–Based Motion Estimation and its Application to Restoration and Interpolation of Motion Pictures", pp. 1–160, Massachusetts Institute of Technology Dept. of Electrical Engineering and Computer Science Research Laboratory of Electronics, Technical Report No. 530, Jun. 1987.

A.N. Netravali et al., "Motion–Compensated Television Coding: Part 1", pp. 631–670, The Bell system Technical Journal, vol. 58, No. 3, Mar. 1979.

R. Paquin et al., "A Spatio–Temporal Gradient Method for Estimating the Displacement Field in Time–Varying Imagery", pp. 205–221, Computer Vision, Graphics, and Image Processing, vol. 21, 1983.

R. Thomson, "Problems of Estimation and Measurement of Motion in Television", pp. 6/1–6/10, The Institution of Electrical Engineers, 1995.

J.F. Vega–Riveros et al., "Review of Motion Analysis Techniques", pp. 397–404, IEE Proceedings, vol. 136, Pt. 1, No. 6, Dec. 1989.

S.F. Wu et al., "A Differential Method for Simultaneous Estimation of rotation, Change of Scale and Translation", pp. 69–80, Signal Processing: Image Communication, vol. 2, 1990.

T. Borer, "Television Standards Conversion", Part 1, pp. 76–Figure 4.28; Part 2, pp. 121–166; and Part 3, pp. 177–Figure 9.10, Thesis for Doctor of Philosophy.

M. Chiba et al., "Detection Of Optical Flow From A Noisy Image", Systems and Computers in Japan, vol. 23, No. 8, Dec. 1990, pp. 97–105.

S. Liou et al., "Motion Detection In Spatio–Temporal Space*", Computer Vision, Grapics, and Image Processing, vol. 45, No. 2, Feb. 1989, pp. 227–250.

* cited by examiner

GRADIENT BASED MOTION ESTIMATION

BACKGROUND OF THE INVENTION

1. Field of the Invention

The invention relates to a technique for estimating motion vectors for a video or film sequence and may be used for example in a motion estimator for use with a standards converter or a video compression system.

2. Description of the Related Art

Gradient motion estimation is one of three or four fundamental motion estimation techniques and is well known in the literature (references 1 to 18). More correctly called 'constraint equation based motion estimation' it is based on a partial differential equation which relates the spatial and temporal image gradients to motion.

Gradient motion estimation is based on the constraint equation relating the image gradients to motion. The constraint equation is a direct consequence of motion in an image. Given an object, 'object(x, y)', which moves with a velocity (u, v) then the resulting moving image, I (x, y, t) is defined by Equation 1;

$$I(x,y,t) = \text{object}(x-ut, y-vt)$$

This leads directly to the constraint equation, Equation 2;

$$u\frac{\partial I(x, y, t)}{\partial x} + v\frac{\partial I(x, y, t)}{\partial y} + \frac{\partial I(x, y, t)}{\partial t} = \frac{\partial \text{object}(x, y)}{\partial t} = 0$$

where, provided the moving object does not change with time (perhaps due to changing lighting or distortion) then $\partial \text{object}/\partial t = 0$. This equation is, perhaps, more easily understood by considering an example. Assume that vertical motion is zero, the horizontal gradient is +2 grey levels per pixel and the temporal gradient is −10 grey levels per field. Then the constraint equation says that the ratio of horizontal and temporal gradients implies a motion of 5 pixels/field. The relationship between spatial and temporal gradients is summarised by the constraint equation.

To use the constraint equation for motion estimation it is first necessary to estimate the image gradients; the spatial and temporal gradients of brightness. In principle there are easily calculated by applying straightforward linear horizontal, vertical and temporal filters to the image sequence. In practice, in the absence of additional processing, this can only really be done for the horizontal gradient. For the vertical gradient, calculation of the brightness gradient is confused by interlace which is typically used for television pictures; pseudo-interlaced signals from film do not suffer from this problem. Interlaced signals only contain alternate picture lines on each field. Effectively this is vertical sub-sampling resulting in vertical aliasing which confuses the vertical gradient estimate. Temporally the situation is even worse, if an object has moved by more than 1 pixel in consecutive fields, pixels in the same spatial location may be totally unrelated. This would render any gradient estimate meaningless. This is why gradient motion estimation cannot, in general, measure velocities greater than 1 pixel per field period (reference 8).

Prefiltering can be applied to the image sequence to avoid the problem of direct measurement of the image gradients. If spatial low pass filtering is applied to the sequence then the effective size of 'pixel' is increased. The brightness gradients at a particular spatial location are then related for a wider range of motion speeds. Hence spatial low pass filtering allows higher velocities to be measured, the highest measurable velocity being determined by the degree of filtering applied. Vertical low pass filtering also alleviates the problem of vertical aliasing caused by interlace. Alias components in the image tend to be more prevalent at higher frequencies. Hence, on average, low pass filtering disproportionately removes alias rather than true signal components. The more vertical filtering that is applied the less is the effect of aliasing. There are, however, some signals in which aliasing extends down to zero frequency. Filtering cannot remove all the aliasing from these signals which will therefore result in erroneous vertical gradient estimates and, therefore, incorrect estimates of the motion vector.

Prefiltering an image sequence results in blurring. Hence small details in the image become lost. This has two consequences, firstly the velocity estimate becomes less accurate since there is less detail in the picture and secondly small objects cannot be seen in the prefiltered signal. To improve vector accuracy hierarchical techniques are sometimes used. This involves first calculating an initial, low accuracy, motion vector using heavy prefiltering, then refining this estimate to higher accuracy using less prefiltering. This does, indeed, improve vector accuracy but it does not overcome the other disadvantage of prefiltering, that is, that small objects cannot be seen in the prefiltered signal, hence their velocity cannot be measured. No amount of subsequent vector refinement, using hierarchical techniques, will recover the motion of small objects if they are not measured in the first stage. Prefiltering is only advisable in gradient motion estimation when it is only intended to provide low accuracy motion vectors of large objects.

Once the image gradients have been estimated the constraint equation is used to calculate the corresponding motion vector. Each pixel in the image gives rise to a separate linear equation relating the horizontal and vertical components of the motion vector and the image gradients. The image gradients for a single pixel do not provide enough information to determine the motion vector for that pixel. The gradients for at least two pixels are required. In order to minimise errors in estimating the motion vector it is better to use more than two pixels and find the vector which best fits the data from multiple pixels. Consider taking gradients from 3 pixels. Each pixel restricts the motion vector to a line in velocity space. With two pixels a single, unique, motion vector is determined by the intersection of the 2 lines. With 3 pixels there are 3 lines and, possibly, no unique solution. This is illustrated in FIG. 1. The vectors $E_1$ to $E_3$ are the error from the best fitting vector to the constraint line for each pixel.

One way to calculate the best fit motion vector for a group of neighouring pixels is to use a least mean square method, that is minimising the sum of the squares of the lengths of the error vectors $E_1$ to $E_3$ FIG. 1. The least mean square solution for a group of neighbouring pixels is given by the solution of Equation 3;

$$\begin{bmatrix} \sigma_{xx}^2 & \sigma_{xy}^2 \\ \sigma_{xy}^2 & \sigma_{yy}^2 \end{bmatrix} \cdot \begin{bmatrix} u_0 \\ v_0 \end{bmatrix} = -\begin{bmatrix} \sigma_{xt}^2 \\ \sigma_{yt}^2 \end{bmatrix}$$

where $$\sigma_{xx}^2 = \sum \frac{\partial I}{\partial x} \cdot \frac{\partial I}{\partial x}, \sigma_{xy}^2 = \sum \frac{\partial I}{\partial x} \cdot \frac{\partial I}{\partial y} \text{ etc}$$

where $(u_0, v_0)$ is the best fit motion vector and the summations are over a suitable region. The (direct) solution of equation 3 is given by Equation 4;

$$\begin{bmatrix} u_0 \\ v_0 \end{bmatrix} = \frac{1}{\sigma_{xx}^2 \sigma_{yy}^2 - \sigma_{xy}^4} \begin{bmatrix} \sigma_{xy}^2 \sigma_{yt}^2 - \sigma_{yy}^2 \sigma_{xt}^2 \\ \sigma_{xy}^2 \sigma_{xt}^2 - \sigma_{xx}^2 \sigma_{yt}^2 \end{bmatrix}$$

Small regions produce detailed vector fields of low accuracy and vice versa for large regions. There is little point in choosing a region which is smaller than the size of the prefilter since the pixels within such a small region are not independent.

Typically, motion estimators generate motion vectors on the same standard as the input image sequence. For motion compensated standards converters, or other systems performing motion compensated temporal interpolation, it is desirable to generate motion vectors on the output image sequence standard. For example when converting between European and American television standards the input image sequence is 625 line 50 Hz (interlaced) and the output standard is 525 line 60 Hz (interlaced). A motion compensated standards converter operating on a European input is required to produce motion vectors on the American output television standard.

The direct implementation of gradient motion estimation, discussed herein in relation to FIGS. 2 and 3, can give wildly erroneous results. Such behaviour is extremely undesirable. These problems occur when there is insufficient information in a region of an image to make an accurate velocity estimate. This would typically arise when the analysis region contained no detail at all or only the edge of an object. In such circumstances it is either not possible to measure velocity or only possible to measure velocity normal to the edge. It is attempting to estimate the complete motion vector, when insufficient information is available, which causes problems. Numerically the problem is caused by the 2 terms in the denominator of equation 4 becoming very similar resulting in a numerically unstable solution for equation 3.

A solution to this problem of gradient motion estimation has been suggested by Martinez (reference 11 and 12). The matrix in equation 3 (henceforth denoted 'M') may be analysed in terms of its eigenvectors and eigenvalues. There are 2 eigenvectors, one of which points parallel to the predominant edge in the analysis region and the other points normal to that edge. Each eigenvector has an associated eigenvalue which indicates how sharp the image is in the direction of the eigenvector. The eigenvectors and values are defined by Equation 5;

$$M.e_i = \lambda_i e_i, i \in \{1,2\}$$

where;

$$M = \begin{bmatrix} \sigma_{xx}^2 & \sigma_{xy}^2 \\ \sigma_{xy}^2 & \sigma_{yy}^2 \end{bmatrix}$$

The eigenvectors $e_i$ are conventionally defined as having length 1, which convention is adhered to herein.

In plain areas of the image the eigenvectors have essentially random direction (there are no edges) and both eigenvalues are very small (there is not detail). In these circumstances the only sensible vector to assume is zero. In parts of the image which contain only an edge feature the eigenvectors point normal to the edge and parallel to the edge. The eigenvalue corresponding to the normal eigenvector is (relatively) large and the other eigenvalue small. In this circumstance only the motion vector normal to the edge can be measured. In other circumstances, in detailed parts of the image where more information is available, the motion vector may be calculated using Equation 4.

The motion vector may be found, taking into account Martinez' ideas above, by using Equation 6;

$$\begin{bmatrix} u_0 \\ v_0 \end{bmatrix} = -\left( \frac{\lambda_1}{\lambda_1^2 + n_1^2} e_1 e_1^t + \frac{\lambda_2}{\lambda_2^2 + n_2^2} e_2 e_2^t \right) \cdot \begin{bmatrix} \sigma_{xt}^2 \\ \sigma_{yt}^2 \end{bmatrix}$$

where superscript t represents the transpose operation. Here $n_1$ & $n_2$ are the computational or signal noise involved in calculating $\lambda_1$ & $\lambda_2$ respectively. In practice $n_1 = n_2$, both being determined by, and approximately equal to, the noise in the coefficients of M. When $\lambda_1$ & $\lambda_2$ <<n then the calculated motion vector is zero; as is appropriate for a plain region of the image. When $\lambda_1$>>n and $\lambda_2$<<n then the calculated motion vector is normal to the predominant edge in that part of the image. Finally if $\lambda_1, \lambda_2$<<n then equation 6 becomes equivalent to equation 4. As signal noise, and hence n, decreases then equation 6 provides an increasingly more accurate estimate of the motion vectors as would be expected intuitively.

In practice calculating motion vectors using the Martinez technique involves replacing the apparatus of FIG. 3, below, with more complex circuitry. The direct solution of equation 6 would involve daunting computational and hardware complexity. It can, however, be implemented using only two-input, pre-calculated, look up tables and simple arithmetic operations.

A block diagram of a direct implementation of gradient motion estimation is shown in FIGS. 2 & 3.

The apparatus shown schematically in FIG. 2 performs filtering and calculation of gradient products and their summations. The apparatus of FIG. 3 generates motion vectors from the sums of gradient products produced by the apparatus of FIG. 2. The horizontal and vertical low pass filters (10,12) in FIG. 2 perform spatial prefiltering as discussed above. The cut-off frequencies of ⅓₂nd band horizontally and ⅟₁₆th band vertically allow motion speeds up to (at least) 32 pixels per field to be measured. Different cut-off frequencies could be used if a different range of speeds is required. The image gradients are calculated by three differentiating filters (16, 17, 18).

The vertical/temporal interpolation filters (20) convert the image gradients, measured on the input standard, to the output standard. Typically the vertical/temporal interpolators (20) are bilinear interpolators or other polyphase linear interpolators. Thus the output motion vectors are also on the output standard. The interpolation filters (20) are a novel feature which facilitates interfacing the motion estimator to a motion compensated temporal interpolator. Temporal low pas filtering is normally performed as part of (all 3 of) the interpolation filters (20). The temporal filter (14) has been re-positioned in the processing path so that only one rather than three filters are required. Note that the filters (10, 12, 14) prior to the multiplier array can be implemented in any order because they are linear filters. The summation of gradient products, specified in equation 3, are implemented by the low pass filters (24) following the multiplier array (22). Typically these filters (24) would be (spatial) running average filters, which give equal weight to each tap with their region of support. Other lowpass filters could also be used at the expense of more complex hardware. The size of these filters (24) determines the size of the neighbourhood used to calculate the best fitting motion vector. Examples of filter coefficients which may be used can be found in the example.

A block diagram of apparatus capable of implementing equation 6 and which replaces that of FIG. 3, is shown in FIGS. 4 and 5.

Each of the 'eigen analysis' blocks (30), in FIG. 4, performs the analysis for one of the two eigenvectors. The output of the eigen-analysis is a vector (with x and y components) equal to $$si = e_i \sqrt{\lambda_i/\lambda_i^2 + n^2}$$

These 's' vectors are combined with vector $(\sigma_{xt}^2, \sigma_{yt}^2)$ (denoted c in FIG. 4), according to equation 6, to give the motion vector according to the Martinez technique.

The eigen analysis, illustrated in FIG. 5, has been carefully structured so that it can be implemented using lookup tables with no more than 2 inputs. This has been done since lookup tables with 3 or more inputs would be impracticably large using today's technology. The implementation of FIG. 5 is based on first normalising the matrix M by dividing all its elements by $(\sigma_{xx}^2 + \sigma_{yy}^2)$. This yields a new matrix, N, with the same eigenvectors ($e_1$ & $e_2$) and different (but related) eigenvalues ($X_1$ & $X_2$). The relationship between M, N and their eigenvectors and values is given by Equation 7;

$$N = \frac{1}{\sigma_{xx}^2 + \sigma_{yy}^2} M = \begin{bmatrix} \frac{\sigma_{xx}^2}{\sigma_{xx}^2 + \sigma_{yy}^2} & \frac{\sigma_{xy}^2}{\sigma_{xx}^2 + \sigma_{yy}^2} \\ \frac{\sigma_{xy}^2}{\sigma_{xx}^2 + \sigma_{yy}^2} & \frac{\sigma_{yy}^2}{\sigma_{xx}^2 + \sigma_{yy}^2} \end{bmatrix}$$

$$M.e_i = \lambda_i e_i$$

$$N.e_i = \chi_i e_i$$

$$\lambda_i = (\sigma_{xx}^2 + \sigma_{yy}^2)\chi_i$$

$$n_2 = (\sigma_{xx}^2 + \sigma_{yy}^2)n_z$$

Matrix N is simpler than M as it contains only two independent values, since the principle diagonal elements ($N_{1,1}, N_{2,2}$) sum to unity and the minor diagonal elements ($N_{1,2}, N_{2,1}$) are identical. The principal diagonal elements may be coded as $(\sigma_{xx}^2 - \sigma_{yy}^2)/(\sigma_{xx}^2 + \sigma_{yy}^2)$ since Equation 8;

$$N_{1,1} = \frac{1}{2}\left(1 + \left(\frac{\sigma_{xx}^2 - \sigma_{yy}^2}{\sigma_{xx}^2 + \sigma_{yy}^2}\right)\right)$$

$$N_{2,2} = \frac{1}{2}\left(1 - \left(\frac{\sigma_{xx}^2 - \sigma_{yy}^2}{\sigma_{xx}^2 + \sigma_{yy}^2}\right)\right)$$

Hence lookup tables 1 & 2 have all the information they require to find the eigenvalues and vectors of N using standard techniques. It is therefore straightforward to precalculate the contents of these lookup tables. Lookup table 3 simply implements the square root function. The key features of the apparatus shown in FIG. 5 are that the eigen analysis is performed on the normalised matrix, N, using 2 input lookup tables (1 & 2 ) and the eigenvalue analysis (from table 2) is re-scaled to the correct value using the output of table 3.

The gradient motion estimator described above is undesirably complex. The motion estimator is robust to images containing limited information but FIGS. 4 and 5 show the considerable complexity involved. The situation is made worse by the fact that many of the signals have a very wide dynamic range making the functional blocks illustrated much more difficult to implement.

SUMMARY OF THE INVENTION

It is an object of the present invention to provide a technique for estimating motion which yields considerable simplifications without sacrificing performance. This is achieved by normalising the basic constraint equation (equation 2) to control the dynamic range of the signals. As well as reducing dynamic range this also makes other simplifications possible.

The invention provides a motion vector estimation apparatus for use in video signal processing comprising means for calculating a plurality of image gradients, means for calculating an angle ($\theta$) corresponding to the orientation of the spatial image gradient vector and the motion speed (vn) in the direction of the spatial image gradient vector from the temporal and spatial image gradients, and means for generating motion vectors from a plurality of values of $\theta$ and vn.

The means for calculating the image gradients may comprise temporal and spatial differentiators.

The means for calculating the values of $\theta$ and vn may comprise a rectangular to polar coordinate converter.

The means for generating motion vectors preferably calculates the best fitting motion vector for a region of the picture based on the constraint equations corresponding to a plurality of image gradients.

In an embodiment the means for generating motion vectors comprises three two-input look up tables containing precalculated values of matrix Z as herein defined in Equation 14. Alternatively the lookup tables contain precalculated values of $\phi^{-1}$ as herein defined.

The invention also provides a method of motion estimation in video or film signal processing comprising calculating a plurality of temporal and spatial image gradients, calculating from the image gradients an angle $\theta$ corresponding to the orientation of the spatial Image gradient vector and the motion speed (vn) in the direction of the spatial image gradient vector, and generating motion vectors from a plurality of pairs of values of $\theta$ and vn.

The step of generating motion vectors may comprise calculating the best fitting motion vector for a region of the picture based on the normalised constraint equations corresponding to a plurality of image gradients.

The motion vectors may be calculated on the basis of equation 11 or 13 as herein defined.

BRIEF DESCRIPTION OF THE DRAWINGS

The invention will now be described in more detail with reference to the accompanying drawings in which.

DESCRIPTION OF THE PREFERRED EMBODIMENT

Figure 1:
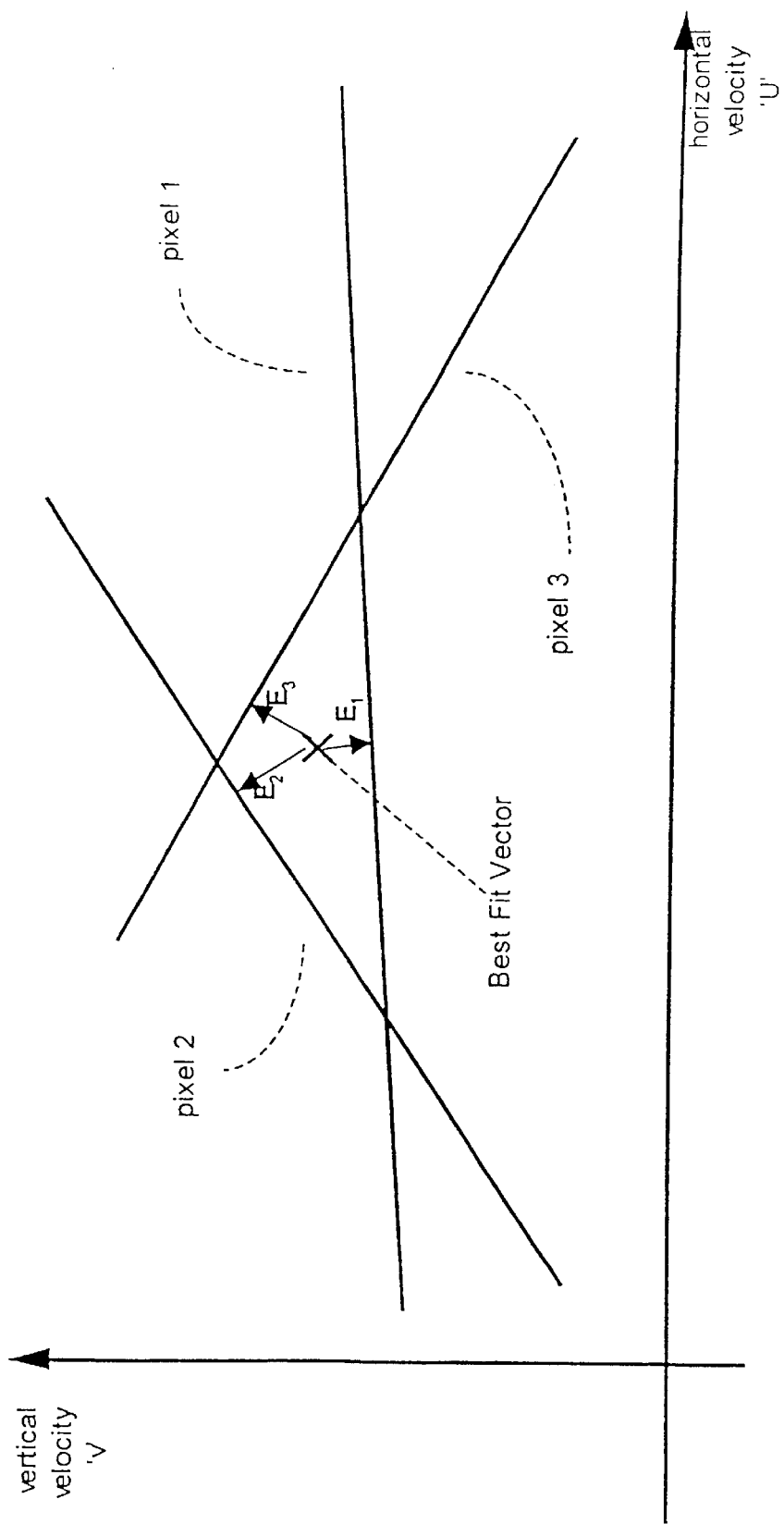
FIG. 1 shows graphically the image gradient constraint lines for three pixels.

Dividing the constraint equation by the modulus of the gradient vector yields a normalised constraint equation i.e. Equation 9:

$$\frac{u\frac{\partial I}{\partial x} + v\frac{\partial I}{\partial y}}{|\nabla I|} = -\frac{\frac{\partial I}{\partial t}}{|\nabla I|}$$

where:

$$\nabla I = \begin{bmatrix} \frac{\partial I}{\partial x} \\ \frac{\partial I}{\partial y} \end{bmatrix} \ \&\ |\nabla I| = \sqrt{\left(\frac{\partial I}{\partial x}\right)^2 + \left(\frac{\partial I}{\partial y}\right)^2}$$

The significance of this normalisation step becomes more apparent if equation 9 is rewritten as Equation 10;

$$u.\cos(\theta) + v.\sin(\theta) = vn$$

$$\cos(\theta) = \frac{\frac{\partial I}{\partial x}}{|\nabla I|},\ \sin(\theta) = \frac{\frac{\partial I}{\partial y}}{|\nabla I|};\ vn = -\frac{\frac{\partial I}{\partial t}}{|\nabla I|}.$$

in which $\theta$ is the angle between the spatial image gradient vector ($\nabla I$) and the horizontal; vn is the motion speed in the direction of the image gradient vector, that is, normal to the predominant edge in the picture at that point. This seems a much more intuitive equation relating, as it does, the motion vector to the image gradient and the motion speed in the direction of the image gradient. The coefficients of equation 10 ($\cos(\theta)$ & $\sin(\theta)$) have a well defined range (0 to 1) and, approximately the same dynamic range as the input signal (typically 8 bits). Similarly vn has a maximum (sensible) value determined by the desired motion vector measurement range. Values of vn greater than the maximum measurement range, which could result from either noise or 'cuts' in the input picture sequence, can reasonably be clipped to the maximum sensible motion speed.

The normalised constraint equation 10 can be solved to find the motion vector in the same way as the unnormalised constraint equation 2. With normalised equation 3 becomes Equation 11;

$$\begin{bmatrix} \sum \cos^2(\theta) & \sum \cos(\theta)\cdot\sin(\theta) \\ \sum \cos(\theta)\cdot\sin(\theta) & \sum \sin^2(\theta) \end{bmatrix} \cdot \begin{bmatrix} u_0 \\ v_0 \end{bmatrix} = \begin{bmatrix} \sum vn\cdot\cos(\theta) \\ \sum vn\cdot\sin(\theta) \end{bmatrix}$$

or:

$$\Phi \cdot \begin{bmatrix} u_0 \\ v_0 \end{bmatrix} = \psi$$

In fact matrix ($\phi$) has only 2 independent elements, since $\cos^2(x)+\sin^2(x)=1$. This is more clearly seen by rewriting $\cos^2(x)$ and $\sin^2(x)$ as $\frac{1}{2}(1 \pm \cos(2x))$ hence equation 11 becomes Equation 12;

$$\frac{1}{2} \cdot \left( N \cdot I + \begin{bmatrix} \sum \cos(2\theta) & \sum \sin(2\theta) \\ \sum \sin(2\theta) & -\sum \cos(2\theta) \end{bmatrix} \right) \cdot \begin{bmatrix} u_0 \\ v_0 \end{bmatrix} = \begin{bmatrix} \sum vn\cdot\cos(\theta) \\ \sum vn\cdot\sin(\theta) \end{bmatrix}$$

where I is the (2×2) identity matrix and N is the number of pixels included in the summations. Again the motion vector can be found using equation 13:

$$\begin{bmatrix} u_0 \\ v_0 \end{bmatrix} = \left( \frac{\lambda_1}{\lambda_1^2 + n_1^2} e_1 e_1^t + \frac{\lambda_2}{\lambda_2^2 + n_2^2} e_2 e_2^t \right) \cdot \begin{bmatrix} \sum vn\cdot\cos(\theta) \\ \sum vn\cdot\sin(\theta) \end{bmatrix}$$

where now e and $\lambda$ are the eigenvectors and eigenvalues of $\phi$ rather than M. Now, because $\phi$ only has two independent elements, the eigen-analysis can now be performed using only three, two-input, lookup tables, furthermore the dynamic range of the elements of $\phi$ (equation 11) is much less than the elements of M thereby greatly simplifying the hardware complexity.

Figure 6:
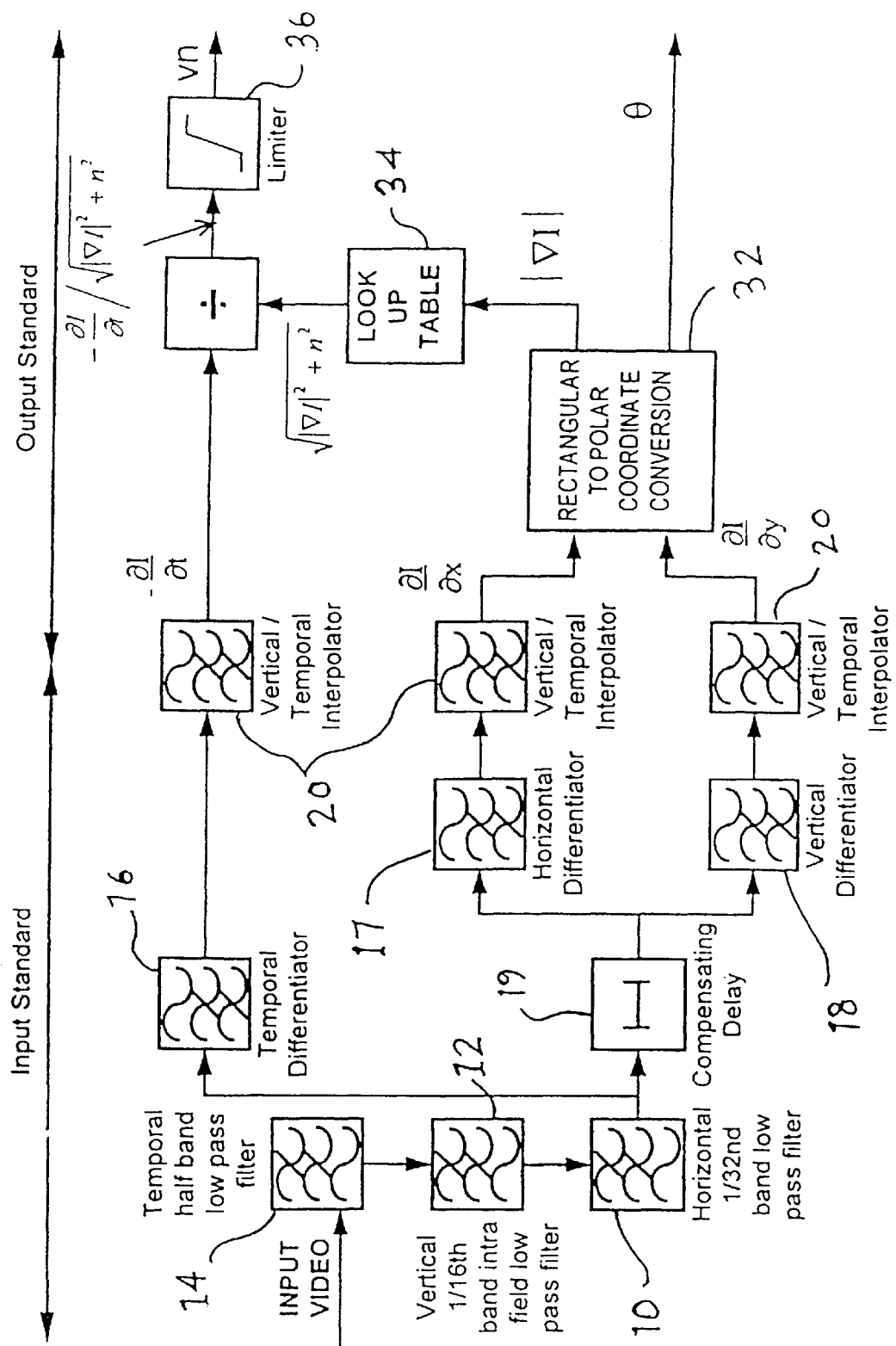
FIGS. 6 and 7 show another embodiment of the gradient motion estimation apparatus according to the invention.
Figure 7:
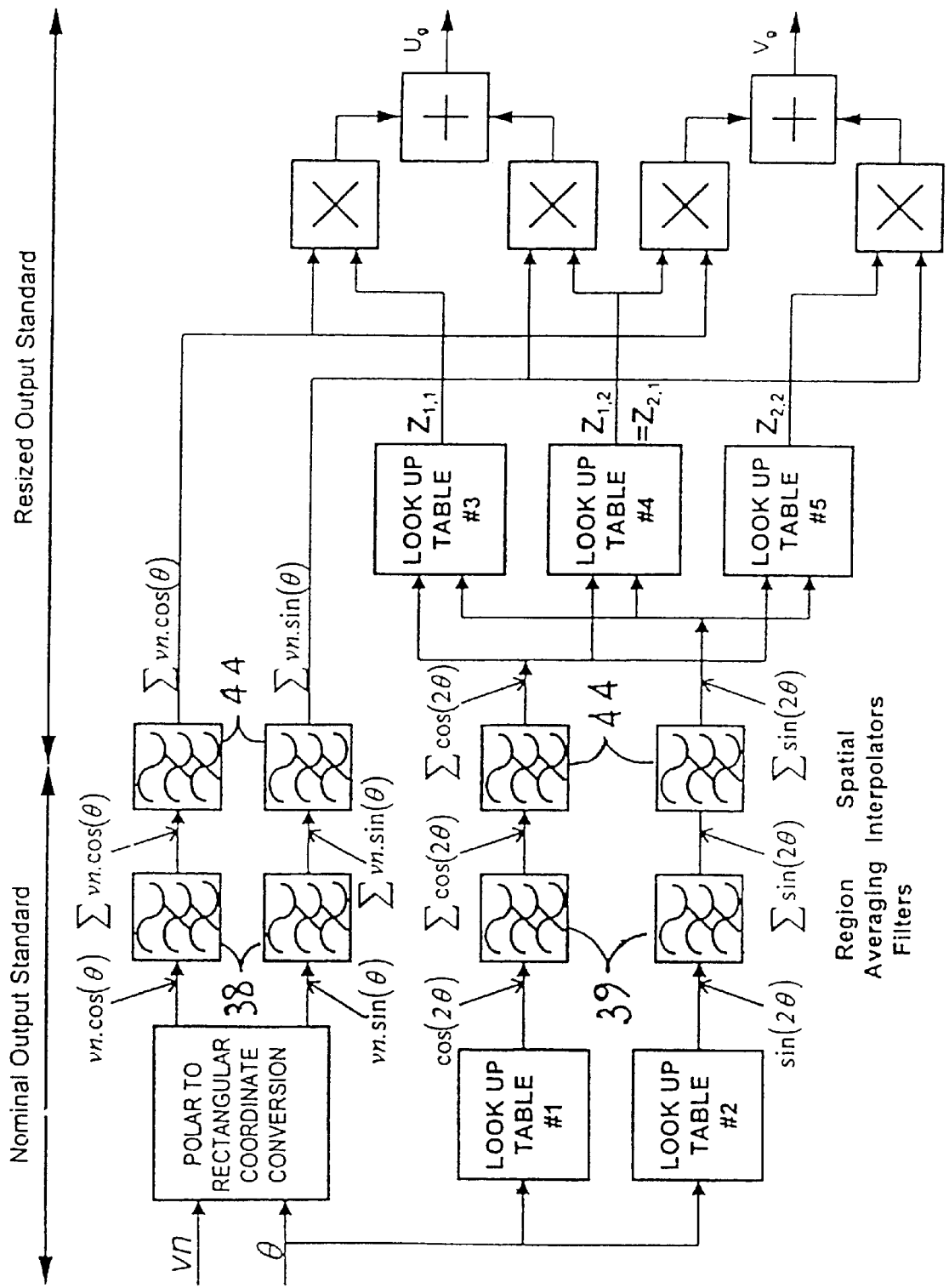

A block diagram of a gradient motion estimator using Martinez technique and based on the normalised constraint equation is shown in FIGS. 6 & 7.

Figure 2:
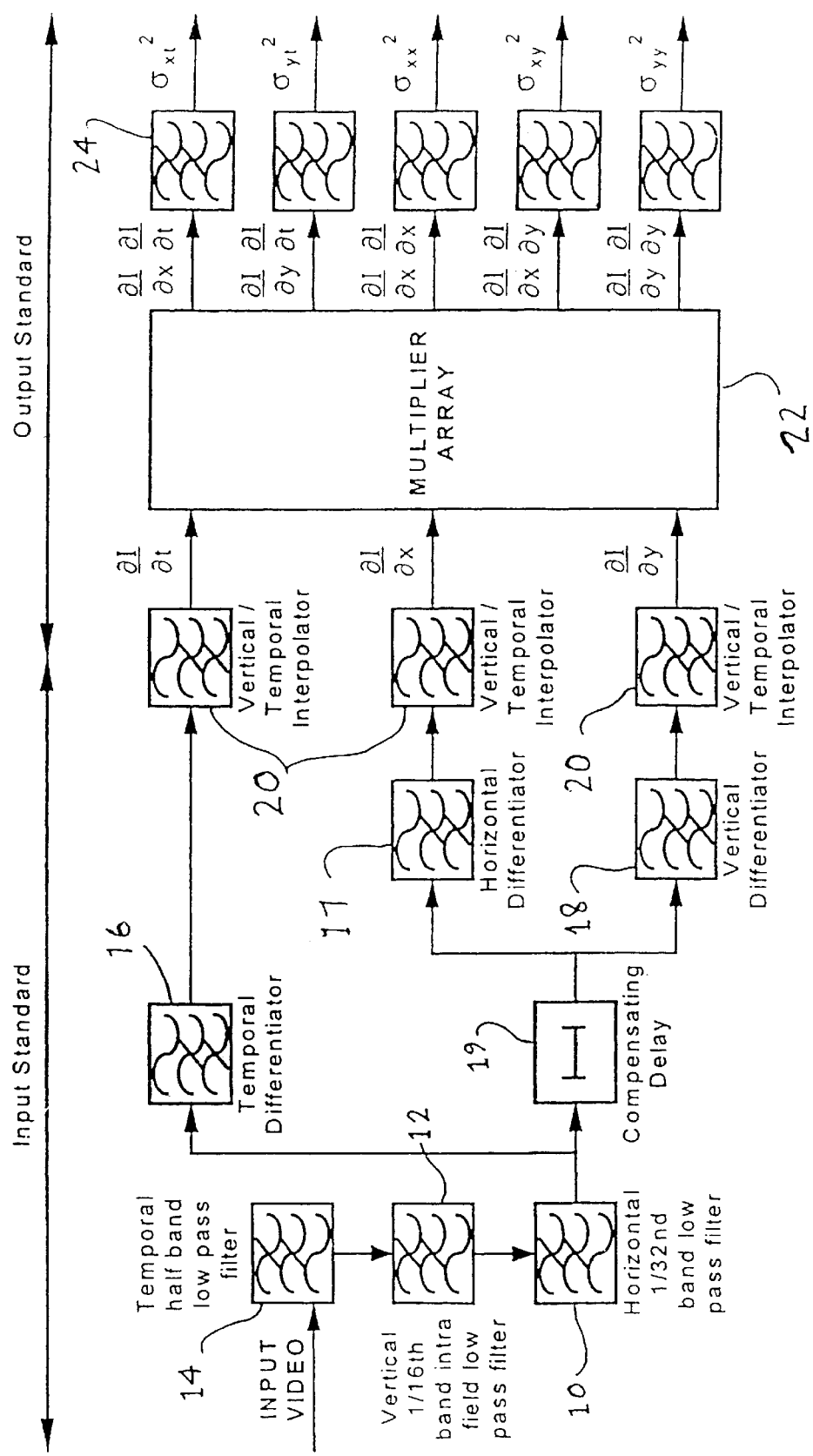
FIGS. 2 and 3 are a block diagram of a motion estimator according to an embodiment of the invention.

The apparatus of FIG. 6 performs the calculation of the normalised constraint equation (equation 10) for each pixel or data value. Obviously, if prefiltering is performed the number of independent pixel values is reduced, the effective pixel size is greater. The filtering in FIG. 6 is identical to that in FIG. 2. The spatial image gradients converted to the output standard are used as inputs for a rectangular to polar coordinate converter (32) which calculates the magnitude of the spatial image vector and the angle $\phi$. A suitable converter can be obtained from Raytheon (Coordinate transformer, model TMC 2330). A lookup table (34) is used to avoid division by very small numbers when there is no detail in a region of the input image. The constant term, 'n', used in the lookup table is the measurement noise in estimating $|\nabla I|$, which depends on the input signal to noise ratio and the prefiltering used. A limiter (36) has also been introduced to restrict the normal velocity, vn, to its expected range (determined by the spatial prefilter). The normal velocity might, otherwise, exceed its expected range when the constraint equation is violated, for example at picture cuts. A key feature of FIG. 6 is that, due to the normalisation that has been performed, the two outputs, vn & $\theta$, have a much smaller dynamic range than the three image gradients in FIG. 2, thereby allowing a reduction in the hardware complexity.

In the apparatus of FIG. 6 the input video is first filtered using separate temporal, vertical and horizontal filters (10, 12, 14), the image gradients are calculated using three differentiating filters (16, 17, 18) and then converted, from the input lattice, to the output sampling lattice using three vertical/temporal interpolators (20), typically bilinear or other polyphase linear filters. For example, with a 625/50/2:1 input the image gradients are calculated on a 525/60/2:1 lattice. The parameters of the normalised constraint equation, vn & $\theta$, are calculated as shown.

The apparatus of FIG. 7 calculates the best fitting motion vector, corresponding to a region of the input image, from the constraint equations for the pixels in that region. The summations specified in equation 12 are implemented by the lowpass filters (38) following the polar to rectangular coordinate converter (40) and lookup tables 1 & 2. Typically these filters would be (spatial) running average filters, which give equal weight to each tap within their region of support. Other lowpass filters could also be used at the expense of more complex hardware. The size of these filters (38, 39) determine the size of the neighbourhood used to calculate the best fitting motion vector. Lookup tables 1 & 2 are simply cosine and sine lookup tables. Lookup tables 3 to 5 contain precalculated values of matrix 'Z' defined by Equation 14;

$$Z = \left( \frac{\lambda_1}{\lambda_1^2 + n_1^2} e_1 e_1^t + \frac{\lambda_2}{\lambda_2^2 + n_2^2} e_2 e_2^t \right)$$

where e and λ and are the eigenvectors and eigenvalues of φ.

Alternatively Z could be $\phi^{-1}$ (ie. assuming no noise), but this would not apply the Martinez technique and would give inferior results. A key feature of FIG. 7 is that the elements of matrix Z are derived using 2 input lookup tables. Their inputs are the output from the two lowpass filters (39) which have a small dynamic range allowing the use of small lookup tables.

The implementations of the gradient motion techniques discussed above seek to find the 'best' motion vector for a region of the input picture. However it is only appropriate to use this motion vector, for motion compensated processing, if it is reasonably accurate. Whilst the determined motion vector is the 'best fit' this does not necessarily imply that it is also an accurate vector. The use of inaccurate motion vectors, in performing motion compensate temporal interpolation, results in objectionable impairments to the interpolated image. To avoid these impairments it is desirable to revert to a non-motion compensated interpolation algorithm when the motion vector cannot be measured accurately. To do this it is necessary to know the accuracy of the estimated motion vectors. If a measure of vector accuracy is available then the interpolation method can be varied between 'full motion compensation' and no motion compensation depending on vector accuracy, a technique known as 'graceful fallback' described in reference 4 & 16.

A technique for measuring the accuracy of motion vectors is the subject of the applicant's co-pending United Kingdom Patent application filed on identical date hereto. This technique is based on the use of the constraint equation and hence is particularly suitable for use with gradient based motion estimation techniques as described above. The method, however, is more general than this and could also be used to estimate the accuracy of motion vectors measured in other ways. The measurement of the accuracy of motion vectors is a new technique. Most of the literature on motion estimation concentrates almost wholly on ways of determining the 'best' motion vector and pays scant regard to considering whether the resulting motion vectors are actually accurate. This may, in part, explain why motion compensated processing is typically, unreliable for certain types of input image.

Once a motion vector has been estimated for a region of an image an error may be calculated for each pixel within that region. That error is an indication of how accurately the motion vector satisfies the constraint equation or the normalised constraint equation (equations 2 and 10 above respectively). The following discussion will use the normalised constraint equation as this seems a more objective choice but the unnormalised constraint equation could also be used with minor changes (the use of the unnormalised constraint equation amounts to giving greater prominence to pixels with larger image gradients). For the $i^{th}$ pixel within the analysis region the error is given by Equation 15;

error$_i$=$vn_i$−$u_0$cos(θ$_i$)−$v_0$sin(θ$_i$)

(for all i when $1 \leq i \leq N$, where N is the number of pixels in the analysis region).

This error corresponds to the distance of the 'best' motion vector ($u_0$, $v_0$), from the constraint line for that pixel (see FIG. 1). Note that equation 11 above gives a motion vector which minimises the sum of the square of these errors. Each error value is associated with the direction of the image gradient for that pixel. Hence the errors are better described as an error vector, $E_i$, illustrated in FIG. 1 and defined by Equation 16;

$E_i^t$=error$_i$.[cos(θ), sin(θ)]

where superscript t represents the transpose operation.

Figure 8:
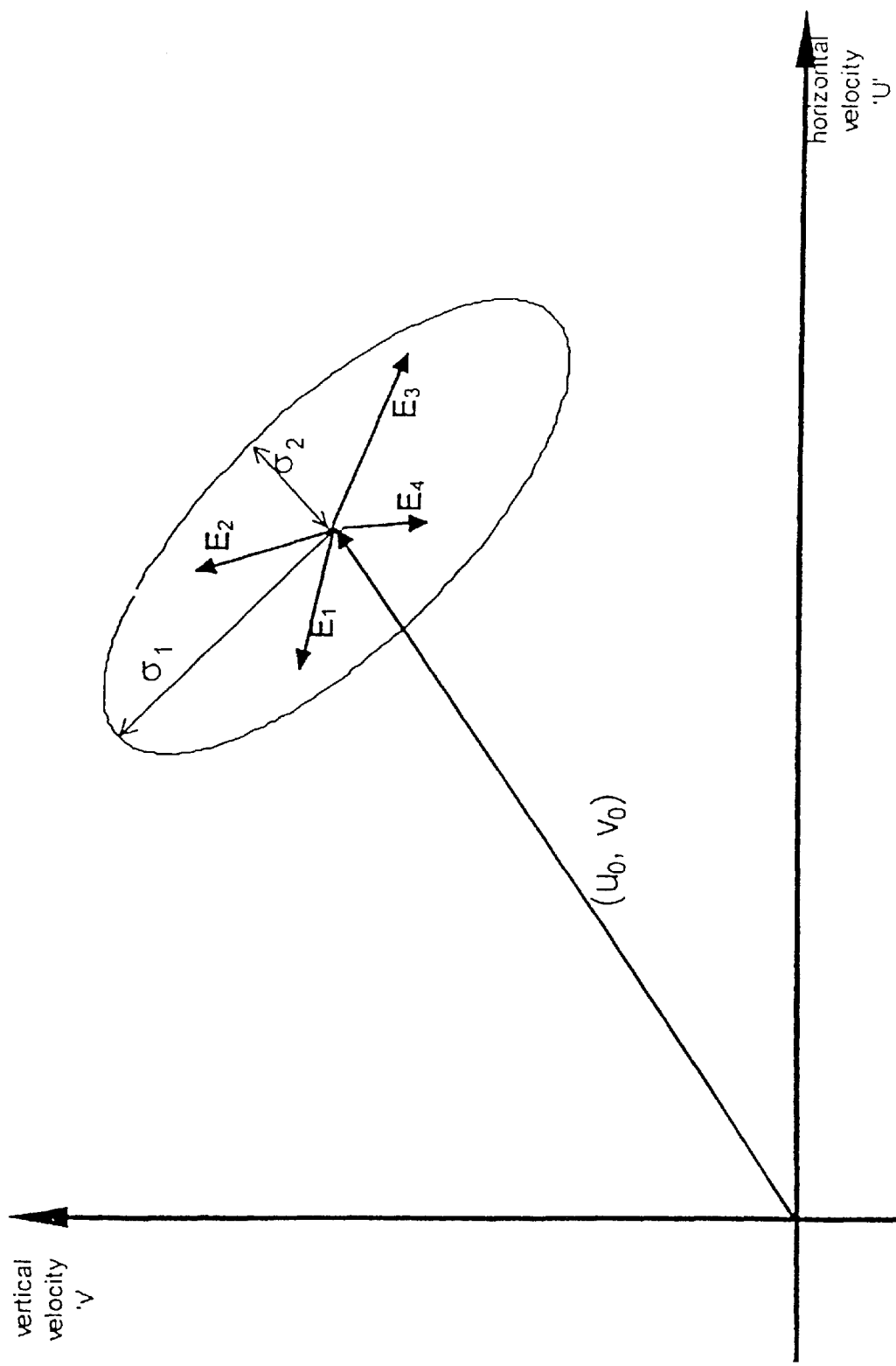
FIG. 8 shows graphically the distribution of errors in the case of a best fit motion vector.

The set of error vectors, [$E_i$], form a two dimensional distribution of errors in motion vector space, illustrated in FIG. 8 below. This distribution of motion vector measurement errors would be expected to be a two dimensional Gaussian (or Normal) distribution. Conceptually the distribution occupies an elliptical region around the true motion vector. The ellipse defines the area in which most of the estimates of the motion vector would lie; the 'best' motion vector points to the centre of the ellipse. FIG. 8 illustrates the 'best' motion vector ($u_0$, $v_0$), and 4 typical error vectors, $E_1$ to $E_4$. The distribution of motion vector measurement errors is characterised by the orientation and length of the major and minor axes ($\sigma_1$, $\sigma_2$) of the ellipse. To calculate the characteristics of this distribution we must first form the (N×2) matrix defined as Equation 17;

$$E = \begin{bmatrix} E_1^t \\ E_2^t \\ \vdots \\ E_N^t \end{bmatrix} = \begin{bmatrix} error_1 \cdot \cos(\theta_1) & error_1 \cdot \sin(\theta_1) \\ error_2 \cdot \cos(\theta_2) & error_2 \cdot \sin(\theta_2) \\ & \\ error_N \cdot \cos(\theta_N) & error_N \cdot \sin(\theta_N) \end{bmatrix}$$

The length and orientation of the axes of the error distribution are given by eigenvector analysis of $E^t$, E; the eigenvectors point along the axes of the distribution and the eigenvalues, $N_{total}\sigma_1^2$ & $N_{total}\sigma_2^2$ (where $N_{total}$ is the total number of pixels in the region used to estimate the errors), give their length (see FIG. 8) that is Equation 18;

($E^tE$)$e_i$=$N_{total}\sigma_i e_i$ where i=1 or 2

The matrix $E^tE$ (henceforth the 'error matrix' and denoted Q for brevity) can be expanded to give Equation 19;

$$E^t \cdot E = \begin{bmatrix} \sum error^2 \cdot \cos^2(\theta) & \sum error^2 \cdot \cos(\theta) \cdot \sin(\theta) \\ \sum error^2 \cdot \cos(\theta) \cdot \sin(\theta) & \sum error^2 \cdot \sin^2(\theta) \end{bmatrix}$$

where the summation is over a region of the image.

The likely motion vector error depends on how the motion vector was measured. If the motion vector was calculated using, for example, block matching then the likely error would be approximately as determined by the above analysis. However it is quite likely that this error estimation technique of the invention would be applied to motion vectors calculated using gradient (constraint equation) based motion estimation. In this latter case the motion vector is, itself, effectively the 'average' of many measurements (i.e. 1 measurement per constraint equation used). Hence the error in the gradient based motion vector is less than the error estimated from the 'error matrix' above. This is an example of the well known effect of taking an average of many measurements to improve the accuracy. If large picture regions are used for gradient motion estimation then more accurate motion vectors are obtained (at the expense, of course, of being unable to resolve small objects). By contrast taking larger regions in a block matching motion estimator does not necessarily increase the vector accuracy (assuming the selected vector is correct), it does however reduce the chance of measuring a 'spurious' vector.

The likely error in the motion vector may be less than the 'size' of the distribution of error vectors. The reduction is specified by a parameter $N_{effective}$ which depends on how the motion vector was measured. For block matching, $N_{effective}$ would be approximately 1. For gradient motion estimation $N_{effective}$ might be as high as the number of pixels used in the measurement. It is more likely, however, that $N_{effective}$ is less than the number of pixels due to the effects of prefiltering the video prior to motion estimation. Prefiltering effectively 'enlarges' the pixels (i.e. individual pixels are not longer independent) reducing the effective number of pixels ($N_{effective}$). Typically the region of the image used both to calculate the motion vector and estimate its error might be 3 times the 'size' (both horizontally and vertically) of the prefilter used. This would give a typical value for $N_{effective}$ of $3^2$.

For a given value of $N_{effective}$ the size of the error distribution, calculated above, must be reduced by the square root of $N_{effective}$. This is the well known result for the reduction in error due to averaging Neffective measurements. Thus, for a typical gradient based motion estimator in which $N_{effective}$ is 9, the likely error in the measured motion vector is 3 times less than the distribution of vector errors calculated above.

In an embodiment, the averaging filter is 95 pixels by 47 field lines, so the total number ($N_{total}$ in FIG. 10) of pixels is 4465. The effective number of pixels ($N_{effective}$) used in error estimation will be less than the total number of pixels if prefiltering is performed. In the specification of the gradient motion estimator parameters in the example, the spatial pre-filter is 1/16th band vertical intra-field and 1/32nd band horizontal. The error estimation region is 3 times the effective size of the spatial pre-filters both horizontally and vertically, giving an effective number of pixels used in the selected error estimation region of 9.

Figure 3:
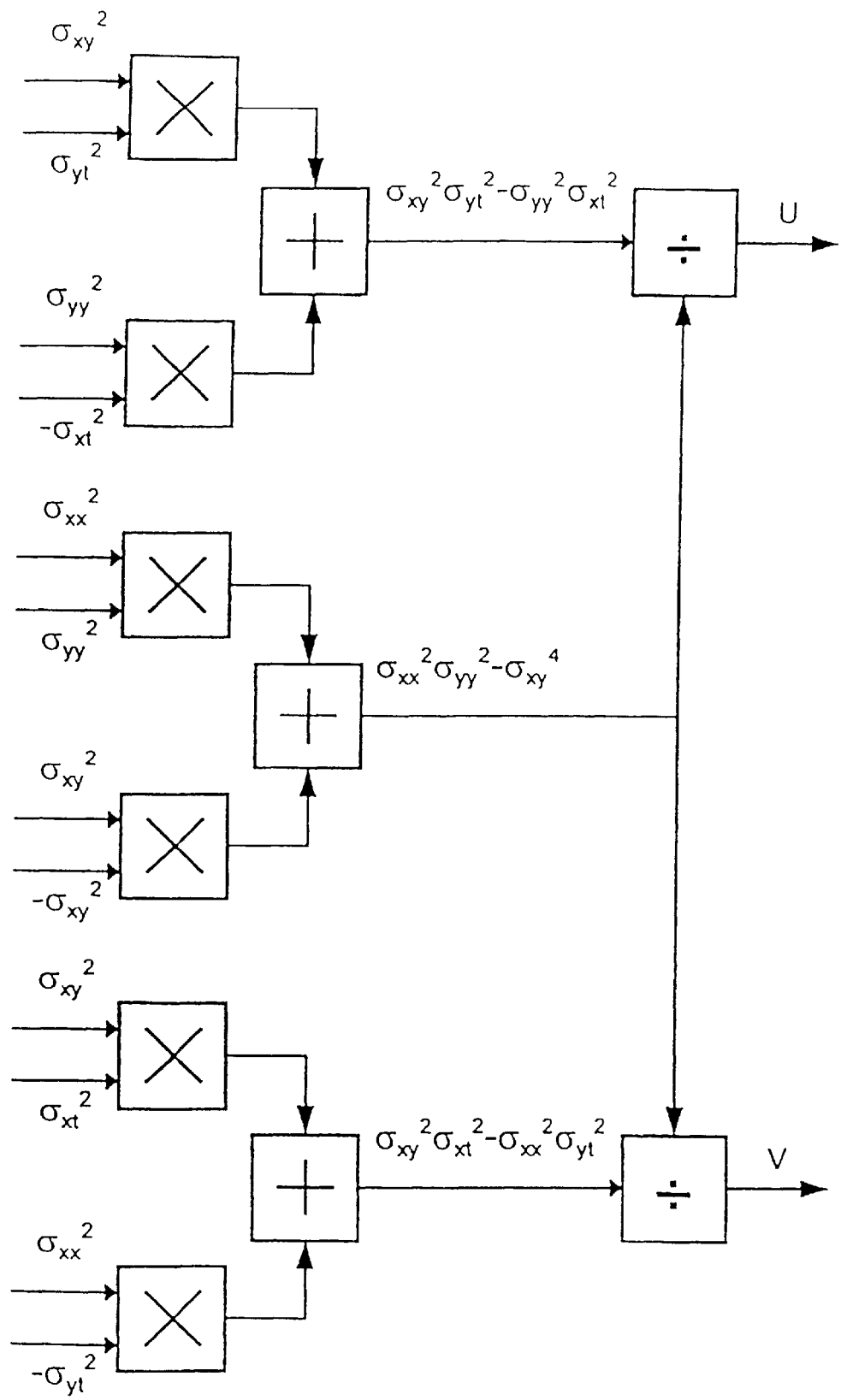
Figure 4:
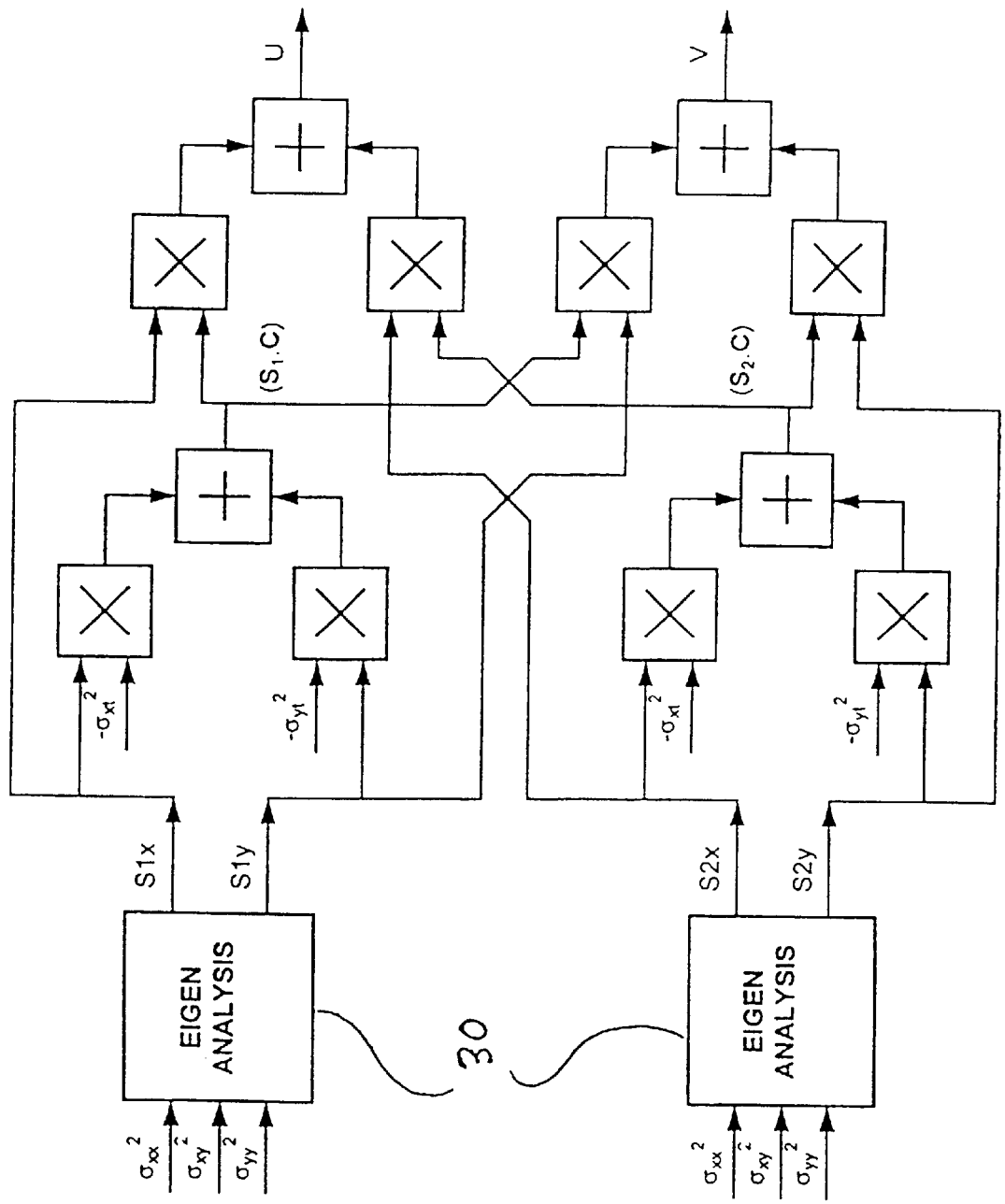
FIGS. 4 is a block diagram of apparatus for calculating motion vectors which can be substituted for the apparatus of FIG. 3.
Figure 9:
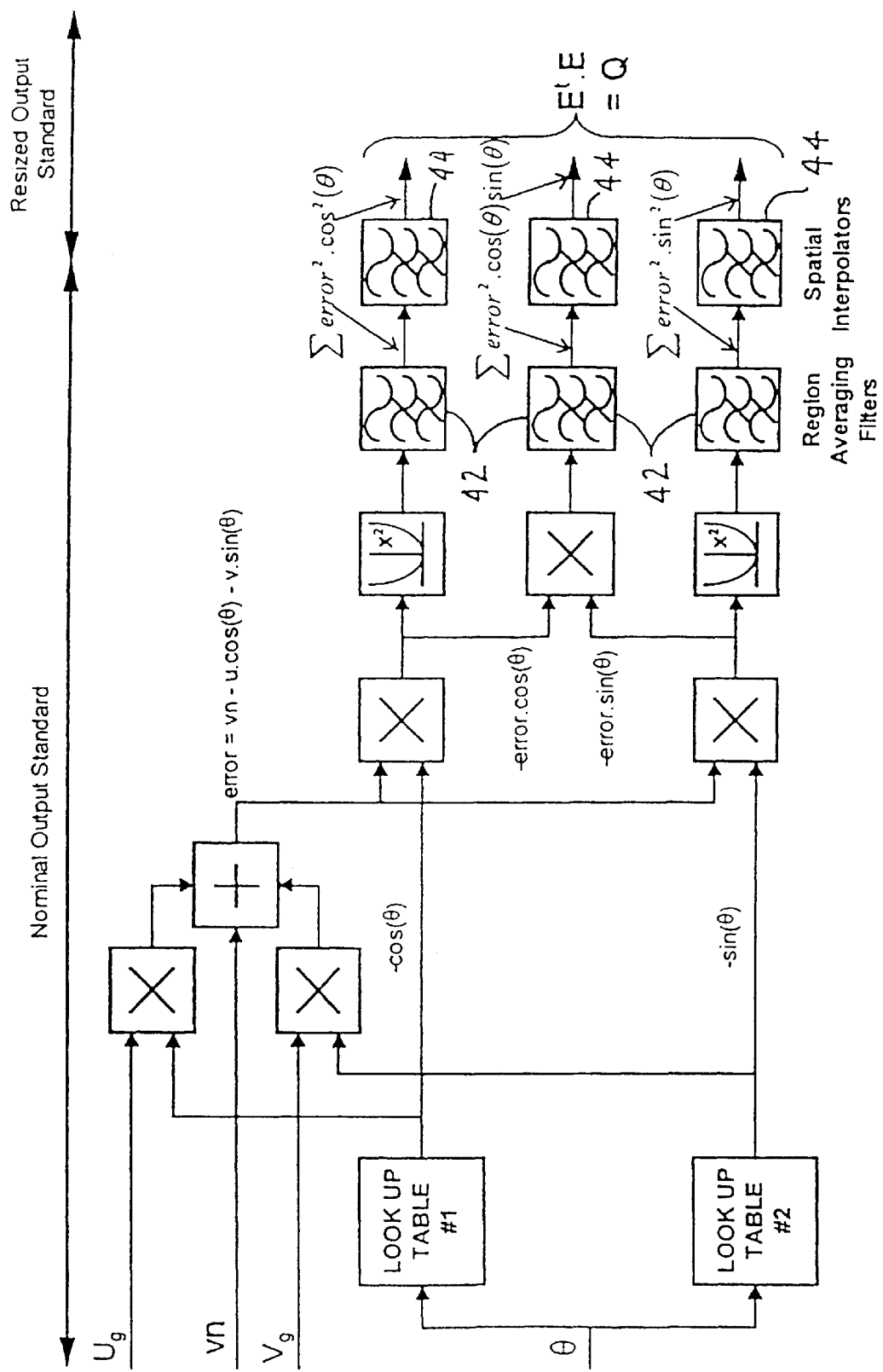
FIGS. 9 and 10 are block diagrams of apparatus capable of providing an indication of the error of motion vectors in a motion estimation system.

To calculate the distribution of motion vector measurement errors it is necessary to first calculate the elements of the error matrix, according to equation 19, then calculate its eigenvectors and eigenvalues. The elements of the error matrix may be calculated by the apparatus of FIG. 9. Other implementations are possible, but FIG. 9 is straight forward and efficient. The inputs to FIG. 9, θ and vn, may be derived as in FIG. 6. The motion vector input to FIG. 9, (u, v), could be derived as in FIG. 7, however it could equally well come from any other source such as FIG. 3 or 4 or even a block matching motion estimator. The lookup tables (1 and 2) are simply cosine and sine tables and, as in FIGS. 2 & 7, the required summations are performed using spatial lowpass filters (42) such as running average filters.

Figure 10:
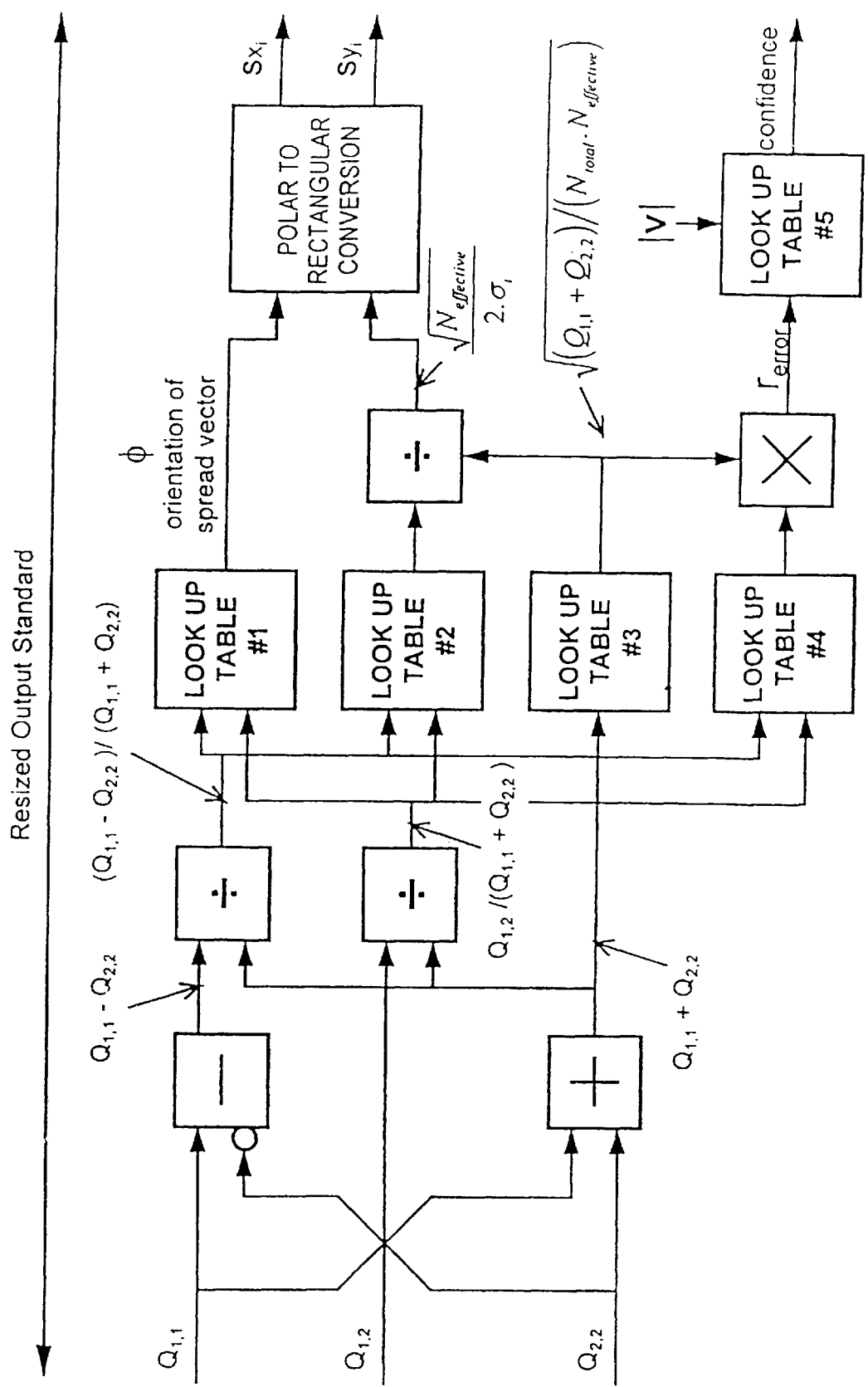

Once the error matrix has been calculated (e.g. as in FIG. 9) its eigenvalues and eigenvectors may be found using the implementation of FIG. 10 whose inputs are the elements of the error matrix, i.e. $\Sigma(error^2.\cos^2(\theta))$, $\Sigma(error^2.\cos(\theta).\sin(\theta))$ and $\Sigma(error^2.\sin^2((\theta)))$, denoted $Q_{11}$, $Q_{12}$ and $Q_{22}$ respectively. Note that, as in FIG. 5, since there are two eigenvalues the implementation of FIG. 10 must be duplicated to generate both eigenvectors. As in FIG. 5, described previously, the implementation of FIG. 10 has been carefully structured so that it uses look up tables with no more than 2 inputs. In FIG. 10 the output of lookup table 1 is the angular orientation of an eigenvector, that is the orientation of one of the principle axes of the (2 dimensional) error distribution. The output of lookup table 2, once it has been rescaled by the output of lookup table 3, is inversely proportional to the corresponding eigenvalue. An alternative function of the eigenvalue (other than its inverse) may be used depending on the application of the motion vector error information.

The spread vector outputs of FIG. 10 ( i.e. $(Sx_i, Sy_i)$ i=1, 2) describe the likely motion vector measurement error for each motion vector in two dimensions. Since a video motion vector is a (2 dimensional) vector quantity, two vectors are required to describe the measurement error. In this implementation the spread vectors point along the principle axes of the distribution of vector measurement errors and their magnitude is the inverse of the standard deviation of measurement error along these axes. If we assume, for example, that the measurement errors are distributed as a 2 dimensional Gaussian distribution, then the probability distribution of the motion vector, v, is given by equation 20;

$$P(v) = (|S_1|.|S_2|/2\pi).\exp(-(((v-v_m).S_1)^2 + ((v-v_m).S_2)^2))$$

where $v_m$ is the measured motion vector and $S_1$ and $S_2$ are the two spread vectors. Of course, the motion vector measurement errors may not have a Gaussian distribution but the spread vectors, defined above, still provide a useful measure of the error distribution. For some applications it may be more convenient to define spread vectors whose magnitude is a different function of the error matrix eigenvalues.

An alternative, simplified, output of FIG. 10 is a scalar confidence signal rather than the spread vectors. This may be more convenient for some applications. Such a signal may be derived from, $r_{error}$, the product of the outputs of lookup tables 3 and 4 in FIG. 10, which provides a scalar indication of the motion vector measurement error.

The confidence signal may then be used to implement graceful fallback in a motion compensated image interpolator as described in reference 4. The $r_{error}$ signal is a scalar, average, measure of motion vector error. It assumes that the error distribution is isotropic and, whilst this may not be justified in some situations, it allows a simple confidence measure to be generated. Note that the scalar vector error, $r_{error}$, is an objective function, of the video signal, whilst the derived confidence signal is an interpretation of it.

A confidence signal may be generated by assuming that there is a small range of vectors which shall be treated as correct. This predefined range of correct vectors will depend on the application. We may, for example, define motion vectors to be correct if they are within, say, 10% of the true motion vector. Outside the range of correct vectors we shall have decreasing confidence in the motion vector. The range of correct motion vectors is the confidence region specified by $r_{confident}$ which might, typically, be defined according to equation 21;

$$r_{confident} = k.|v| + r^0$$

where k is a small fraction (typically 10%) and $r_0$ is a small constant (typically 1 pixel/field) and |v| is the measured moti speed. The parameters k and r0 can be adjusted during testing to achieve best results. Hence the region of confidence is proportional to the measured motion speed accept at low speeds when it is a small constant. The confidence value is then calculated, for each output motion vector, as the probability that the actual velocity is within the confidence radius, $r_{confident}$, of the measured velocity. This may be determined by assuming a Gaussian probability distribution:

$$confidence = \frac{1}{2\pi r_{error}^2} \int_0^{r_{confident}} 2\pi x \cdot \exp\left(-\frac{1}{2}\frac{x^2}{r_{error}^2}\right) dx$$

giving the following expression for vector confidence (equation 22):

$$confidence = 1 - \exp(-\frac{1}{2}(r_{confidence}^2/r_{error}^2))$$

An embodiment of apparatus for estimating vector error is shown in FIGS. 6, 9 and 10. The apparatus of FIG. 9 calculates the error matrix using the outputs from the apparatus of FIG. 6, which were generated previously to estimate the motion vector. The error matrix input in figure, $E^r.E$, is denoted Q to simplify the labelling. The content of lookup tables 1 & 2 in FIG. 10 are defined by:

Look Up Table $1 = \text{angle}(2y, -(x \pm \sqrt{(x^2+4y^2)}))$

Look Up Table $2 = 1/\sqrt{(2(1 \pm \sqrt{(x^2+4y^2)}))}$

Where;

$$x = \frac{Q_{1,1} - Q_{2,2}}{Q_{1,1} + Q_{2,2}}$$

and $$y = \frac{Q_{1,2}}{Q_{1,1} + Q_{2,2}}$$

where the 'angle(x, y)' function gives the angle between the x axis and point (x, y) and where the positive sign is taken for one of the eigenanalysis units and the negative sign is taken for the other unit.

The input of lookup table 3 in FIG. 10 ($Q_{11}+Q_{22}$) is a dimensioned parameter (z) which describes the scale of the distribution of motion vector errors. The content of lookup table 3 is defined by $\sqrt{(z/N_{total} \cdot N_{effective})}$. The output of Lookup table 3 is a scaling factor which can be used to scale the output of lookup table 2 defined above. The input to the polar to rectangular coordinate converter is, therefore, related to the inverse of the length of each principle axis of the error distribution. Using different Lookup table it would be possible to calculate the spread vectors directly in cartesian co-ordinates.

The apparatus described in relation to FIG. 10, is capable of producing both the spread vectors and the scalar confidence signal. The present invention encompasses methods and apparatus which generate only one such parameter; either the confidence signal or the spread vectors. The eigen analyses performed by the apparatus of FIG. 10 must be performed twice to give both spread vectors for each principle axis of the error distribution; only one implementation of FIG. 10 is required to generate $r_{error}$ and the derived confidence signal. The inputs to lookup table 4 are the same as for lookup table 1 (x and y). The content of Lookup table 4 is defined by $\sqrt[4]{(\frac{1}{4}(1-x^2)-y^2)}$. The output of lookup table 4 scaled by the output of lookup table 3 gives $r_{error}$ a scalar (isotropic) vector error from which a confidence signal is generated in lookup table 5, the contents of which are defined by equation 22, for example. $r_{error}$ is the geometric mean of the length of the major and minor axes of the error distribution, that is, $r_{error} = \sqrt{(\sigma_1 \cdot \sigma_2)}$.

In FIGS. 7 and 9 picture resizing is allowed for using (intrafield) spatial interpolators (44) following the region averaging filters (38,39,42). Picture resizing is optional and is required for example for overscan and aspect ratio conversion. The apparatus of FIG. 6 generates its outputs on the nominal output standard, that is assuming no picture resizing. The conversion from input to (nominal) output standard is achieved using (bilinear) vertical/temporal interpolators (20). Superficially it might appear that these interpolators (20) could also perform the picture stretching or shrinking required for resizing. However, if this were done the region averaging filters (38,42) in FIGS. 7 and 9 would have to vary in size with the resizing factor. This would be very awkward for large picture expansions as very large region averaging filters (38,42) would be required. Picture resizing is therefore achieved after the region averaging filters using purely spatial (intrafield) interpolators (44), for example bilinear interpolators. In fact the function of the vertical/temporal filters (20) in FIG. 6 is, primarily, to interpolate to the output field rate. The only reason they also change the line rate is to maintain a constant data rate.

EXPERIMENTAL RESULTS

Figure 5:
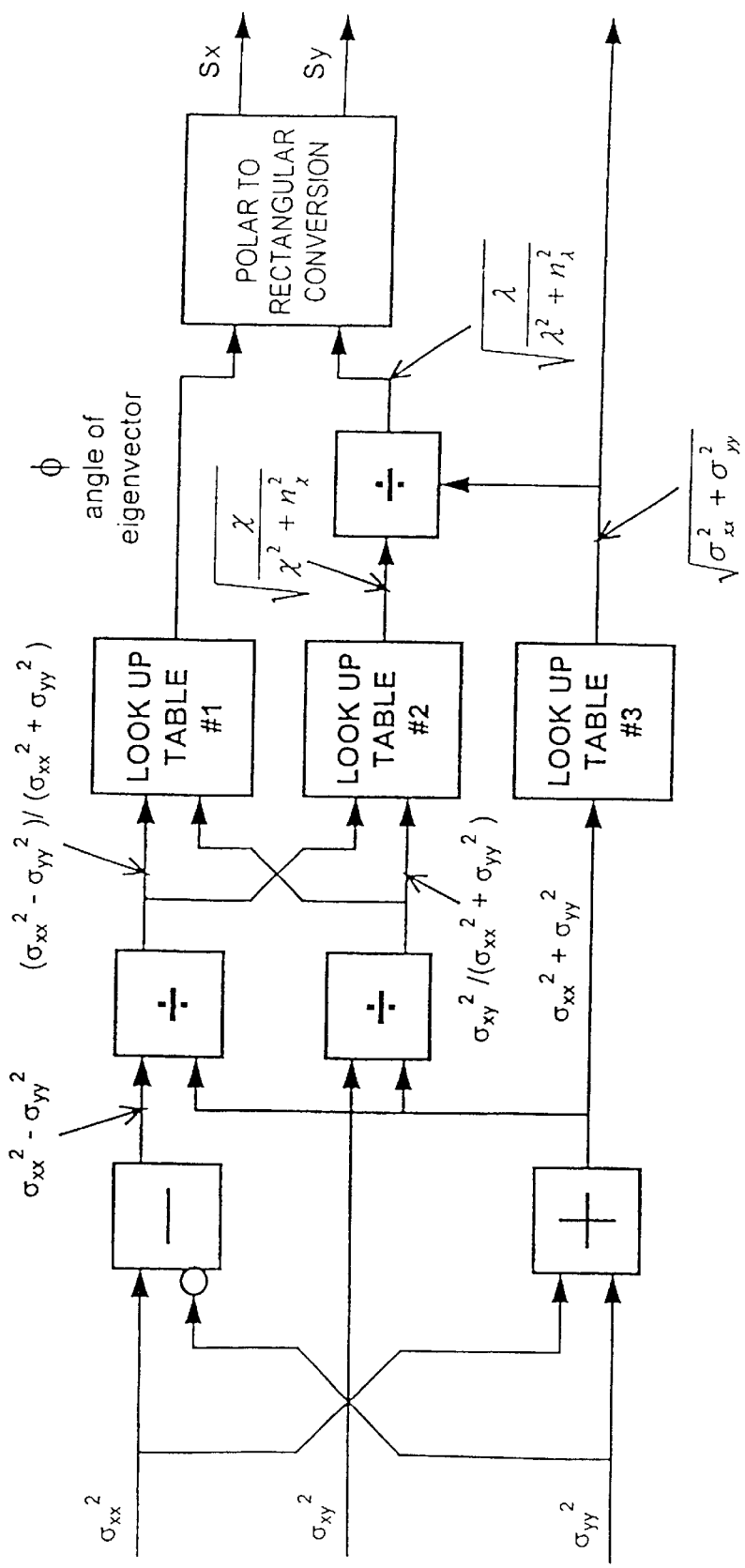
FIG. 5 is a block diagram of apparatus for implementing the eigenanalysis required in FIG. 4.

Experiments were performed to simulate the basic motion estimation algorithm (FIGS. 2 & 3), use of the normalised constraint equation (FIGS. 6 & 7), the Martinez technique with the normalised constraint equation and estimation of vector measurement error (FIGS. 9 & 5). In general these experiments confirmed the theory and techniques described above.

Simulations were performed using a synthetic panning sequence. This was done both for convenience and because it allowed a precisely known motion to be generated. Sixteen field long interlaced sequences were generated from an image for different motion speeds. The simulation suggested that the basic gradient motion estimation algorithm gives the correct motion vector with a (standard deviation) measurement error of about $\pm \frac{1}{4}$ pixel/field. The measured velocity at the edge of the picture generally tends towards zero because the filters used are not wholly contained within the image. Occasionally unrealistically high velocities are generated at the edge of image. The use of the normalised constraint equation gave similar results to the unnormalised equation. Use of the Martinez technique gave varying results depending on the level of noise assumed. This technique never made things worse and could significantly reduce worst case (and average) errors at the expense of biasing the measured velocity towards zero. The estimates of the motion vector error were consistent with the true (measured) error.

EXAMPLE

This example provides a brief specification for a gradient motion estimator for use in a motion compensated standards converter. The input for this gradient motion estimator is interlaced video in either 625/50/2:1 or 525/60/2:1 format. The motion estimator produces motion vectors on one of the two possible input standards and also an indication of the vector's accuracy on the same standard as the output motion vectors. The motion vector range is at least ±32 pixels/field. The vector accuracy is output as both a 'spread vector' and a 'confidence signal'.

A gradient motion estimator is shown in block diagram form in FIGS. 6 & 7 above. Determination of the measurement error, indicated by 'spread vectors' and 'confidence' are shown in FIGS. 9 & 10. The characteristics of the functional blocks of these block diagrams is as follows:

Input Video:

4:2:2 raster scanned interlaced video.

luminance component only

Active field 720 pixel×288 or 244 field lines depending on input standard.

Luminance coding 10 bit, unsigned binary representing the range 0 to $(2^{10}-1)$ Temporal Halfband Lowpass Filter (14):

Function: Temporal filter operating on luminance. Implemented as a vertical/temporal filter because the input is interlaced. The coefficients are defined by the following matrix in which columns represent fields and rows represent picture (not field) lines.

Temporal Half band filter coefficients=⅛

$$\text{Temporal Halfband filter coefficients} = 1/8 \begin{pmatrix} 1 & 0 & 1 \\ 0 & 4 & 0 \\ 1 & 0 & 1 \end{pmatrix}$$

Input: 10 bit unsigned binary representing the range 0 to 1023(decimal).

Output: 12 bit unsigned binary representing the range 0 to 1023.75(decimal) with 2 fractional bits.

Vertical Lowpass Filter (12):

Function: Vertical intra field, $1/16^{th}$ band, lowpass, prefilter and anti-alias filter. Cascade of 3, vertical running sum filters with lengths 16, 12 and 5 field lines. The output of this cascade of running sums is divided by 1024 to give an overall D.C. gain of $15/16$. The overall length of the filter is 31 field lines.

Input: As Temporal Halfband Lowpass Filter output.

Output: As Temporal Halfband Lowpass Filter output.

Horizontal Lowpass Filter (10):

Function: Horizontal, $1/32^{nd}$ band, lowpass, filter, Cascade of 3, horizontal, running sum filters with lengths 32, 21 and 12 pixels. The output of this cascade is divided by 8192 to give an overall D.C. gain of 63/64. The overall length of the filter is 63 pixels.

Input: As Vertical Lowpass Filter output.

Output: As Vertical Lowpass Filter output.

Temporal Differentiator (16):

Function: Temporal differentiaion of prefiltered luminance signal. Implemented as a vertical/temporal filter for interlaced inputs.

Temporal Differentiator coefficients=¼

$$\text{Temporal Differentiator coefficients} = 1/4 \begin{pmatrix} 1 & 0 & -1 \\ 0 & 0 & 0 \\ 1 & 0 & -1 \end{pmatrix}$$

Input: As Horizontal Lowpass Filter output.

Output: 12 bit 2's complement binary representing the range $-2^9$ to $(+2^9-2^{-2})$.

Horizontal Differentiator (17):

Function: Horizontal differentiation of prefiltered luminance signal. 3 tap horizontal filter with coefficients ½(1, 0, -1) on consecutive pixels.

Input: As Horizontal Lowpass Filter output.

Output: 8 bit 2's complement binary representing the range $-2^4$ to $(+2^4-2^{-3})$.

Vertical Differentiator (18):

Function: Vertical differentiation of prefiltered luminance signal. 3 tap, intra-field, vertical filter with coefficients ½(1, 0, -1) on consecutive field lines.

Input: As Horizontal Lowpass Filter output.

Output: 8 bit 2's complement binary representing the range $-2^4$ to $(+2^4-2^{-3})$.

Compensating Delay (19):

Function: Delay of 1 input field.

Input & Output: As Horizontal Lowpass Filter output.

Vertical/Temporal Interpolators (20):

Function: Conversion between input and output scanning standards. Cascade of intra field, 2 field line linear interpolator and 2 field linear interpolator, i.e. a vertical/temporal bi-linear interpolator. Interpolation accuracy to nearest $1/32^{nd}$ field line and nearest $1/16^{th}$ field period.

Inputs: as indicated in FIG. 6 and specified above.

Outputs: same precision as inputs.

θ: Orientation of spatial gradient vector if image brightness. 12 bit unipolar binary spanning the range 0 to $2\pi$ i.e. quantisation step is $2\pi/2^{12}$. This is the same as 2's complement binary spanning the range $-\pi$ to $+\pi$.

|∇I|: Magnitude of spatial gradient vector of image brightness. 12 bit unipolar binary spanning the range 0 to 16 (input grey levels/pixel) with 8 fractional bits.

n: Noise level of |∇I| adjustable from 1 to 16 input grey levels/pixel.

vn: Motion vector of current pixel in direction of brightness gradient. 12 bit, 2's complement binary clipped to the range $-2^6$ to $(+2^6-2^{-5})$ pixel/field.

Polar to Rectangular Co-ordinate Converter (40):

Inputs: as vn & θ above

Outputs: 12 bit, 2's complement binary representing the range $-2^6$ to $(+2^{6-2-5})$ Lookup Tables No. 1 & No. 2 (FIGS. 7 and 9)

Function: Cosine and Sine lookup tables respectively.

Inputs: as θ above.

Outputs: 12 bit, 2's complement binary representing the range $-1$ to $(+1-2^{-11})$.

Region Averaging Filters (38,39,42):

Function: Averaging signals over a region of the image. 95 pixels by 47 field lines, intrafield, running average filter.

Inputs & Outputs: 12 bit 2's complement binary.

Spatial Interpolators (44):

Function: Converting spatial scanning to allow for picture resizing. Spatial, intrafield bilinear interpolator. Interpolation accuracy to nearest $1/32$nd field line and nearest $1/16$th pixel.

Inputs: 12 bit 2's complement binary.

Outputs: 12 or 8/9 bit 2's complement binary.

Upper Interpolators feeding multipliers 12 bit.

Lower interpolators feeding Lookup tables 8/9 bit (to ensure a practical size table).

Look Up Tables 3 to 5 (FIG. 7):

Function: Calculating matrix 'Z' defined in equation 14 above Parameters $n_1$ & $n_2$ adjust on test (approx. 2–5).

Inputs: 8/9 bit 2's complement binary representing $-1$ to (approx.) $+1$.

Outputs: 12 bit 2's complement binary representing the range 16 to (+16-2-5).

Multipliers & Accumulators:

Inputs & Outputs: 12 bit 2's complement binary.

Motion Vector Output:

Output of FIG. 7.

Motion vectors are measure in input picture lines (not field lines) or horizontal pixels per input field period.

Motion speeds are unlikely to exceed ±48 pixels/field but an extra bit is provided for headroom.

Raster scanned interlaced fields.

Active field depends on output standard: 720 pixels×288 or 244 field lines.

12 bit signal, 2's complement coding, 8 integer and 4 fractional bits representing the range −128 to (+128−$2^4$)

Spread Vectors $S_1$ and $S_2$ (Output of FIG. 10):

Spread vectors represent the measurement spread of the output motion vectors parallel and perpendicular to edges in the input image sequence.

The spread vectors are of magnitude $\sigma^{-1}$ (where $\sigma$ represents standard deviation) and point in the direction of the principle axes of the expected distribution of measurement error. Each spread vector has two components each coded using two complement fractional binary representing the range −1 to (−1−$2^{-7}$).

Confidence Output:

Output of FIG. 10, derivation of confidence signal described above.

The confidence signal is an indication of the reliability of the 'Output Motion Vector'. Confidence of 1 represents high confidence, 0 represents no confidence.

The confidence signal uses 8 bit linear coding with 8 fractional bits representing the range 0 to (1−$2^{-8}$).

REFERENCES

1. Aggarwal, J. K. & Nandhakumar, N. 1988. On the computation of motion from sequence of images—a review. Proc. IEEE, vol. 76, pp. 917–935,August 1988.
2. Bierling, M., Thoma, R. 1986. Motion compensating field interpolation using a hierarchically structured displacement estimator. Signal Processing, Volume 11, No. 4, December 1986, pp. 387–404. Elsevier Science publishers.
3. Borer, T. J., 1992. Television Standards Conversion. Ph.D. Thesis, Dept.Electronic & Electrical Engineering, University of Surrey, Guildford, Surrey, GU2 5XH, UK. October 1992.
4. Borer, T. J., 1995. Adaptive Motion trajectories for interpolating moving images. UK Patent Application No. 9519311.6, filed Sep. 21, 1995.
5. Cafforio, C., Rocca, F. 1983. The differential method for image motion estimation. Image sequence processing and dynamic scene analysis (ed.T. S. Huang). Springer-Verlag, pp 104–124, 1983.
6. Cafforo, C., Rocca, F., Tubaro, S., 1990. Motion Compensated Image Interpolation. IEEE Trans. on Comm. Vol. 38, No. 2, February 1990, pp215–222.
7. Dubois, E., Konrad, J., 1990. Review of techniques for motion estimation and motion compensation. Fourth International Colloquium on Advanced Television Systems, Ottawa, Canada, June 1990. Organised by CBC Engineering, Montreal, Quebec, Canada.
8. Fennema, C. L., Thompson, W. B., 1979. Velocity determination in scenes containing several moving objects. Computer Vision, Graphics and Image Processing, Vol. 9, pp 301–315, 1979.
9. Huahge, T. S., Tsai, R. Y., 1981. Image sequence analysis: Motionestimation. Image sequence analysis, T. S. Huange (editor), Springer;Verlag, Berlin, Germany, 1981, pp. 1–18.
10. Konrad, J., 1990. Issues of accuracy and complexity in motioncompensation for ATV systems. Contribution to 'Les Assises Des JeunesChercheurs', CBC, Montreal, June 1990.
11. Lim, J. S., 1990. Two-dimensional signal and image processing. PrenticeHall 1990. 1SBN 0-13-934563-9, pp 497–511.
12. Martinez, D. M. 1987. Model-based motion estimation and its application to restoration and interpolation of motion pictures. RLE Technical Report No.530.June 1987. Research Laboratory of Electronics, Massachusetts Institute of Technology, Cambridge, Mass. 02139 USA.
13. Netravali, A. N., Robbins, J. D. 1979. Motion compensated television coding, Part 1. Bell Syst. Tech. J., vol. 58, pp 631–670, March 1979.
14. Paquin, R., Dubois, E., 1983. A spatlo-temporal gradient method for estimating the displacement vector field in time-varying imagery. ComputerVision, Graphics and Image Processing, Vol. 21, 1983, pp 205–221.
15. Robert, P., Cafforio, C., Rocca, F., 1985. Time/Space recursion for differential motion estimation. Spie Symp., Cannes, France, November 1985.
16. Thomson, R., 1995. Problems of Estimation and Measurement of Motion in Television. I.E.E. Colloquium on motion reproduction in television. I.E.E. Digest No: 1995/093, May 3, 1995.
17. Vega-riveros, J. F., Jabbour, K. 1986. Review of motion analysis techniques. 1EE Proceedings, Vol. 136, Pt I., No. 6, December 1989.
18. Wu, S. F., Kittler, J., 1990. A differential method for the simultaneous estimation of rotation, change of scale and translation. Image Communication, Vol. 2, No. 1, May 1990, pp 69–80.

What is claimed is:

1. A motion vector estimation apparatus for use in video signal processing comprising:

a means for calculating a set of image gradients for each of a plurality of pixels;

a means for calculating for each said set of image gradients an angle corresponding to an orientation of a spatial image gradient vector;

a means for calculating from each said set of image gradients a motion speed in a direction of the spatial image gradient vector; and a means for generating motion vectors from a plurality of values of said angle and said motion speed;

wherein said means for generating motion vectors calculates a best fitting motion vector for a region of a picture based on normalized constraint equations corresponding to said sets of image gradients for said plurality of pixels.

2. The motion vector estimation apparatus as claimed in claim 1, wherein the means for calculating the image gradients comprises temporal and spatial differentiators.

3. The motion vector estimation apparatus as claimed in claim 1, wherein each of the means for calculating an angle and the means for calculating a motion speed comprises a rectangular to polar coordinate converter.

4. A motion vector estimation apparatus for use in video signal processing wherein motion vectors are generated for a region of a picture based on normalized constraint equations corresponding to image gradients for a plurality of pixels, comprising:

a means for calculating a set of said image gradients for each of said plurality of pixels;

a means for calculating for each said set of image gradients an angle corresponding to an orientation of a spatial image gradient vector;

a means for calculating from each said set of image gradients a motion speed in a direction of the spatial image gradient vector; and a means for generating motion vectors from a plurality of values of said angle and said motion speed;

wherein the means for generating motion vectors calculates the motion vectors using the equation:

$$\begin{bmatrix} u_0 \\ v_0 \end{bmatrix} = \left( \frac{\lambda_1}{\lambda_1^2 + n_1^2} e_1 e_1^t + \frac{\lambda_2}{\lambda_1^2 + n_2^2} e_2 e_2^t \right) \cdot \begin{bmatrix} \sum vn \cdot \cos(\Theta) \\ \sum vn \cdot \sin(\Theta) \end{bmatrix}$$

where now e and λ are eigenvectors and eigenvalues of a matrix given by:

$$\begin{bmatrix} \sum \cos^2(\theta) & \sum \cos(\theta) \cdot \sin(\theta) \\ \sum \cos(\theta) \cdot \sin(\theta) & \sum \sin^2(\theta) \end{bmatrix}$$

where θ is an angle between the spatial image gradient vector and horizontal.

5. The motion vector estimation apparatus as claimed in claim 4, wherein said means for generating motion vectors comprises three look-up tables, each of said look-up tables having two inputs and containing pre-calculated values of a matrix defined by:

$$Z = \left( \frac{\lambda_1}{\lambda_1^2 + n_1^2} e_1 e_1^t + \frac{\lambda_2}{\lambda_1^2 + n_2^2} e_2 e_2^t \right).$$

6. The motion vector estimation apparatus as claimed in claim 4, wherein said means for generating motion vectors comprises three look-up tables, each said look-table having two inputs and containing pre-calculated values of $\phi^{-1}$ where:

$$\Phi = \begin{bmatrix} \sum \cos^2(\Theta) & \sum \cos(\Theta) \cdot \sin(\Theta) \\ \sum \cos(\Theta) \cdot \sin(\Theta) & \sum \sin^2(\Theta) \end{bmatrix}.$$

7. A method of motion estimation in video or film signal processing wherein motion vectors are generated for a region of a picture based on normalized constraint equations corresponding to image gradients for a plurality of pixels, comprisng the steps of:
   calculating a set of temporal and spatial image gradients for each of a plurality of said pixels,
   calculating from each said set of image gradients an angle corresponding to an orientation of a spatial image gradient vector,
   calculating from each said set of image gradients a motion speed in a direction of the spatial image gradient vector, and
   generating motion vectors from a plurality of values of said angle and said motion speed;
   wherein the motion vectors are calculated on the basis of the following equation:

$$\begin{bmatrix} u_0 \\ v_0 \end{bmatrix} = \left( \frac{\lambda_1}{\lambda_1^2 + n_1^2} e_1 e_1^t + \frac{\lambda_2}{\lambda_1^2 + n_2^2} e_2 e_2^t \right) \cdot \begin{bmatrix} \sum vn \cdot \cos(\Theta) \\ \sum vn \cdot \sin(\Theta) \end{bmatrix}$$

where now e and λ are eigenvectors and eigenvalues of a matrix given by:

$$\begin{bmatrix} \sum \cos^2(\Theta) & \sum \cos(\Theta) \cdot \sin(\Theta) \\ \sum \cos(\Theta) \cdot \sin(\Theta) & \sum \sin^2(\Theta) \end{bmatrix}$$

and where θ is an angle between the spatial image gradient vector and horizontal.

8. A motion vector estimation apparatus for use in video signal processing wherein motion vectors are generated for a region of a picture based on normalized constraint equations corresponding to image gradients for a plurality of pixels, comprising:
   a means for calculating a set of said image gradients for each of said plurality of pixels;
   a means for calculating for each said set of image gradients an angle corresponding to an orientation of a spatial image gradient vector;
   a means for calculating from each said set of image gradients a motion speed in a direction of the spatial image gradient vector; and
   a means for generating motion vectors from a plurality of values of said angle and said motion speed using the following equation:

$$u.\cos(\theta) + v.\sin(\theta) = vn$$

where:

$$\cos(\theta) = \frac{\frac{\partial I}{\partial x}}{|\nabla I|}, \sin(\theta) = \frac{\frac{\partial I}{\partial y}}{|\nabla I|}, vn = -\frac{\frac{\partial I}{\partial t}}{|\nabla I|}$$

and where θ is the angle between the spatial image gradient vector $\overline{\nabla I}$ and the horizontal.

* * * * *